United States Patent
Kang et al.

(10) Patent No.: US 11,669,531 B2
(45) Date of Patent: Jun. 6, 2023

(54) METHOD AND SYSTEM FOR PROVIDING SPORTS TEAM RANKING ON REAL-TIME ISSUE

(71) Applicant: NAVER CORPORATION, Seongnam-si (KR)

(72) Inventors: Junhee Kang, Seongnam-si (KR); Beomkeun Kim, Seongnam-si (KR); KyungTae Hwang, Seongnam-si (KR); Jehyung Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 17/397,705

(22) Filed: Aug. 9, 2021

(65) Prior Publication Data

US 2022/0043824 A1 Feb. 10, 2022

(30) Foreign Application Priority Data

Aug. 10, 2020 (KR) .................. 10-2020-0100177

(51) Int. Cl.
G06F 16/30 (2019.01)
G06F 16/2457 (2019.01)
G06F 16/953 (2019.01)
G06F 16/906 (2019.01)

(52) U.S. Cl.
CPC ...... G06F 16/24578 (2019.01); G06F 16/906 (2019.01); G06F 16/953 (2019.01)

(58) Field of Classification Search
CPC . G06F 16/906; G06F 16/24578; G06F 16/953
See application file for complete search history.

(56) References Cited

U.S. PATENT DOCUMENTS

| 8,145,623 | B1 | 3/2012 | Mehta et al. |
| 2012/0191756 | A1* | 7/2012 | Son .................. G06F 3/0484 707/E17.014 |
| 2013/0006914 | A1* | 1/2013 | Ray .................. G06F 16/9535 707/738 |
| 2020/0097560 | A1 | 3/2020 | Kulkarni |

FOREIGN PATENT DOCUMENTS

| KR | 1020090016328 | 2/2009 |
| KR | 10-1284686 | 7/2013 |

OTHER PUBLICATIONS

Article entitled "Extracting Semantic Entities and Events from Sports Tweets", by Choudhury et al., dated 2011 (Year: 2011).*
Article entitled "Reuters Tracer: Toward Automated News Production Using Large Scale Social Media Data", by Liu et al., dated 2017 (Year: 2017).*

(Continued)

*Primary Examiner* — Mahesh H Dwivedi
(74) *Attorney, Agent, or Firm* — Greer Burns & Crain, Ltd.

(57) ABSTRACT

A method for providing a sports team ranking, including receiving a plurality of sports search terms input from a plurality of user terminals, clustering the plurality of sports search terms into a plurality of events including a first event and a second event, calculating a score for the first event based on a number of searches of each of a first set of sports search terms included in the first event, and associating the first event with a first sports team.

20 Claims, 11 Drawing Sheets

(56) References Cited

OTHER PUBLICATIONS

Article entitled "Analysis of Query Keywords of Sports-Related Queries using Visualization and Clustering", by Zhang et al., dated May 13, 2009 (Year: 2009).*
Article entitled "Yahool's New Search Box of Awesome: Search Direct", by Yahoo, dated Mar. 23, 2011 (Year: 2011).*
Spirakis et al., Internet and Network Economics, Lecture Notes, Dec. 15-17, 2006, pp. 1-410, Springer-Verlag Berlin Heidelberg 2006.

* cited by examiner

FIG. 7

| KEYWORD | WEIGHT |
|---|---|
| VICTORY | x10.0 |
| SHUTOUT VICTORY | x6.0 |
| SHUTOUT | x6.0 |
| CYCLING HIT | x6.0 |
| BACK TO BACK HOME RUN | x4.0 |
| BACK TO BACK | x4.0 |
| COMPLETE VICTORY | x3.0 |
| COMPLETE | x3.0 |
| HOME RUN | x2.0 |
| BENCH CLEARING | x1.5 |
| BENCL | x1.5 |
| GOOD DEFENSE | x1.5 |

710

| KEYWORD | WEIGHT |
|---|---|
| VICTORY | x10.0 |
| HAT TRICK | x6.0 |
| GOAL | x2.0 |
| PENALTY KICK | x1.8 |
| ASSIST | x1.5 |

| | | 810 |
|---|---|---|
| "MANCHESTER UNITED FAIL TO SIGN HAALAND" SCHOLES<br>"SHOULD HAVE BROUGHT HAALAND EVEN AT A HUGE EXPENSE" | 2020.07.06 13:35 | |

820

MANCHESTER UNITED'S RASHFORD
"WE DON'T KNOW WHAT LEVEL GREENWOOD WILL REACH IN 5 YEARS"    2020.07.06 13:24

830

COACH SOLSKJAER "GREENWOOD'S DETERMINATION IS THE BEST
--- ENGLAND NATIONAL TEAM POSSIBLE"    2020.07.06 13:08

840

"SANCHO TOO EXPENSIVE" MANCHESTER UNITED CONSIDERS SWITCHING TO
MUSCLE MAN TRAORE --- THE PROBLEM IS THE TRANSFER FEE    2020.07.06 13:04

850

LIVERPOOL COACH KLOPP:
"I'M NOT OBSESSED WITH THE MOST POINTS IN THE PL"    2020.07.06 12:30

FIG. 9

| | | | | |
|---|---|---|---|---|
| 910 | 920 | 930 | 940 | |
| ALL | K LEAGUE | KBO | PREMIER LEAGUE | ... |

K LEAGUE SPORTS TEAM RANKING CHART

| | | | | |
|---|---|---|---|---|
| ▲ | 1 | JEONBUK HYUNDAI MOTORS ➡ JEONBUK 1ST PLACE | MOVE TO MY TEAM |
| ▲ | 2 | ULSAN HYUNDAI FOOTBALL TEAM ➡ ULSAN VICTORY | MOVE TO MY TEAM |
| ▼ | 3 | SANGJU SANGMU SOCCER TEAM ➡ 3RD IN K LEAGUE | MOVE TO MY TEAM |
| ▲ | 4 | DAEGU FC ➡ DAEGU FC, 3 WINS IN A ROW | MOVE TO MY TEAM |
| — | 5 | POHANG STEELERS ➡ STEELERS COACH | MOVE TO MY TEAM |
| ▲ | 6 | GANGWON FC ➡ GANGWON FC GOALKEEPER | MOVE TO MY TEAM |
| ▲ | 7 | GWANGJU FC ➡ MARCO URENA | MOVE TO MY TEAM |
| ▼ | 8 | SEONGNAM FC ➡ KISH HAT TRICK | MOVE TO MY TEAM |
| — | 9 | FC SEOUL ➡ YONG-SOO CHOI TACTICS | MOVE TO MY TEAM |
| — | 10 | SUWON SAMSUNG BLUEWINGS ➡ SUWON SAMSUNG VICTORY | MOVE TO MY TEAM |

FIG. 10

| 1010 | 1020 | 1030 | 1040 | 1050 |
|------|------|------|------|------|
| ALL | FOOTBALL | VOLLEYBALL | BASEBALL | BASKETBALL | ...

SOCCER SPORTS TEAM RANKING CHART

| ▲ | 1 | | LIVERPOOL ➡ LEAGUE 1ST | MOVE TO MY TEAM |
| ▲ | 2 | | ULSAN HYUNDAI FOOTBALL TEAM ➡ ULSAN VICTORY | MOVE TO MY TEAM |
| ▼ | 3 | | LEICESTER CITY ➡ PREMIER LEAGUE 4TH | MOVE TO MY TEAM |
| ▲ | 4 | | DAEGU FC ➡ DAEGU FC, 3 WINS IN A ROW | MOVE TO MY TEAM |
| — | 5 | | MANCHESTER UNITED ➡ POGBA HAT-TRICK | MOVE TO MY TEAM |
| ▲ | 6 | | REAL MADRID ➡ BENZEMA GOAL | MOVE TO MY TEAM |
| ▲ | 7 | | GWANGJU FC ➡ MARCO URENA | MOVE TO MY TEAM |
| ▼ | 8 | | BAYERN MUNICH ➡ IVAN FULL TIME | MOVE TO MY TEAM |
| — | 9 | | LEVERKUSEN ➡ LEVERKUSEN VICTORY | MOVE TO MY TEAM |
| — | 10 | | SUWON SAMSUNG BLUEWINGS ➡ SUWON SAMSUNG VICTORY | MOVE TO MY TEAM |

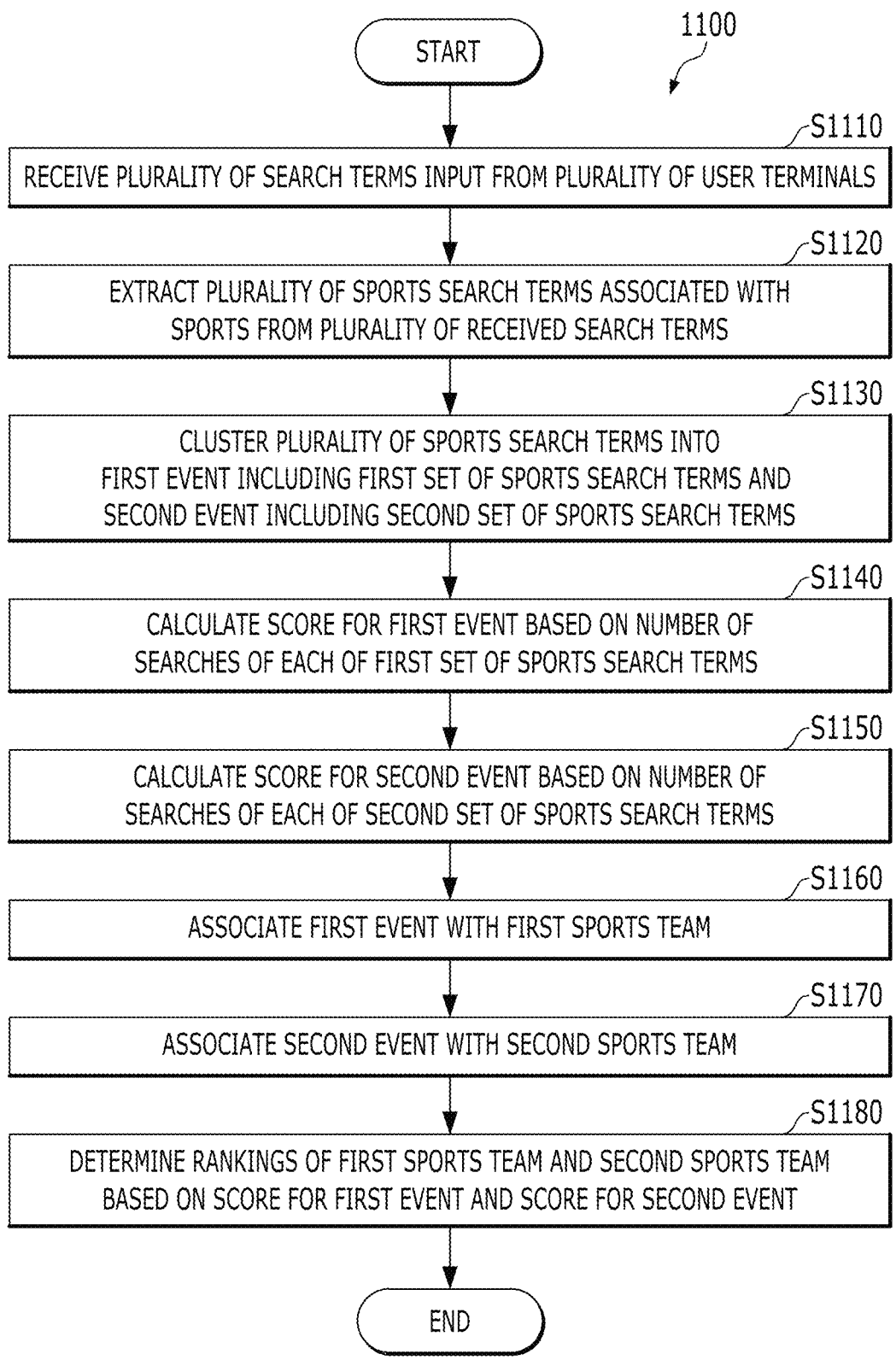

METHOD AND SYSTEM FOR PROVIDING SPORTS TEAM RANKING ON REAL-TIME ISSUE

CROSS-REFERENCE TO RELATED APPLICATION

This application claims priority under 35 U.S.C § 119 to Korean Patent Application No. 10-2020-0100177, filed in the Korean Intellectual Property Office on Aug. 10, 2020, the entire contents of which are hereby incorporated by reference.

BACKGROUND OF THE INVENTION

Field of Invention

The present disclosure relates to a method and a system for providing a sports team ranking, and more particularly, to a method and a system for providing a sports team ranking using sports search terms entered through a search engine.

Description of Related Art

With the widespread use of mobile devices such as smartphones and the like and the development of the Internet, users can easily and quickly acquire desired information in their daily life. Specifically, in order to obtain a desired search result, a user may input a search term into an application with a search function such as a web browser and be provided with various pieces of content. In addition, the user may be provided with a list of real-time search terms generated based on search terms recently input by numerous users through a web browser or the like, and easily check the various pieces of content associated with multiple interests and current issues by clicking on search terms included in the real-time search term list.

In the field of sports, unpredictability and surprises can arise, such as unpopular or weak teams setting phenomenal records and the like. Meanwhile, less famous teams, even when they set an important record, may not appear in the real-time search term list and may be placed behind the entertainment issues and the like, as there are not many search terms entered for these teams. As a result, there is a problem in that the latest events in the field of sports are not properly provided to users through the real-time search term list.

BRIEF SUMMARY OF THE INVENTION

In order to solve the problems described above, the present disclosure provides a method for providing a sports team ranking, as well as a non-transitory computer-readable recording medium storing instructions for providing a sports team ranking, and an apparatus (system) for providing a sports team ranking.

The present disclosure may be implemented in a variety of ways, including a method, an apparatus (system), or a non-transitory computer-readable storage medium storing instructions.

According to an embodiment, a method for providing a sports team ranking is provided, which may be performed by at least one processor and which may include receiving a plurality of sports search terms input from a plurality of user terminals, clustering the plurality of sports search terms into a plurality of events including a first event and a second event, calculating a score for the first event based on a number of searches of each of a first set of sports search terms included in the first event, and associating the first event with a first sports team.

According to an embodiment, there is provided a non-transitory computer-readable recording medium storing instructions for executing the method for providing a sports team ranking described above on a computer.

According to an embodiment, a system for providing a sports team ranking may be provided, which may include a communication module, a memory, and at least one processor connected to the memory and configured to execute at least one computer-readable program included in the memory. The at least one program may include instructions for receiving a plurality of sports search terms input from a plurality of user terminals; clustering the plurality of sports search terms into a plurality of events including a first event and a second event, calculating a score for the first event based on a number of searches for each of a first set of sports search terms included in the first event, and associating the first event with a first sports team.

In various embodiments of the present disclosure, a sports team ranking generated by extracting only the sports search terms of the search terms entered into the search engine may be provided, thereby allowing the user to view the sports-related real-time events for each sports team at a glance without including content based on other issues such as politics, entertainment, society, and the like.

In various embodiments of the present disclosure, it is possible to provide sports team rankings of the sports teams for which many users are currently searching or which have been introduced in many of the latest news articles.

In various embodiments of the present disclosure, it is possible to reflect the events related to the sports games to the sports team ranking more effectively, by reflecting the weight for each keyword when determining the sports team ranking.

In various embodiments of the present disclosure, the weights may be applied to the events mainly mentioned in the latest sports news to increase the event score, thereby generating a sports team ranking that reflects the latest sports event.

In various embodiments of the present disclosure, the user can check real-time sports events and sports team trends with respect to the sports teams in a league in which the user is interested at a glance.

In various embodiments of the present disclosure, the user can check real-time sports events and sports team trends with respect to the sports teams in the sports category in which the user is interested at a glance.

BRIEF DESCRIPTION OF THE DRAWINGS

Embodiments of the present disclosure will be described with reference to the accompanying drawings described below, where similar reference numerals indicate similar elements, although embodiments are not limited thereto, in which:

FIG. 7 is a diagram illustrating an example of weight data for each keyword according to an embodiment;

FIG. 8 is a diagram illustrating an example of determining a weight for an event based on sports news data according to an embodiment;

FIG. 9 is a diagram illustrating an example in which a sports team ranking for each league is provided according to an embodiment;

FIG. 10 is a diagram illustrating an example in which a sports team ranking for each sports category is provided according to an embodiment; and FIG. 11 is a flowchart illustrating an example of a method for providing a sports team ranking according to an embodiment.

DETAILED DESCRIPTION OF THE INVENTION

Figure 1:
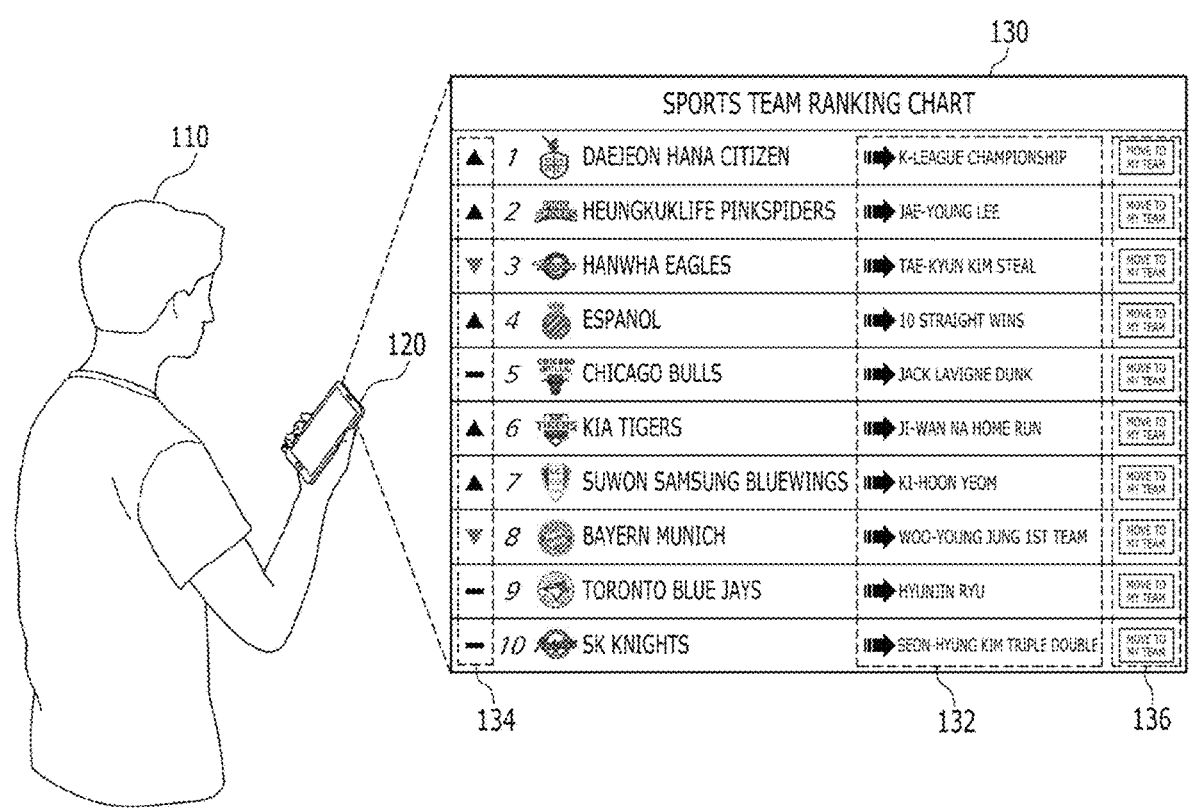
FIG. 1 is a diagram illustrating an example in which a sports team ranking is provided according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, the "sports team rankings" may refer to rankings of sports teams that reflect a "degree of interest of users" with respect to sports game events that are currently receiving attention. In an embodiment, the sports team ranking may be determined based on the number of searches for a sports search term input by a user.

FIG. 1 is a diagram illustrating an example in which the sports team ranking 130 is provided according to an embodiment. A user 110 may be provided with the sports team ranking 130 through an application (e.g., a search application, a web browser application, and the like) running on a user terminal 120. Specifically, the user 110 may be provided with the sports team ranking 130 in which the sports teams that are currently receiving attention are listed, through the application running on the user terminal 120. The sports team ranking 130 may include sports teams from different sports categories, such as soccer teams, baseball teams, volleyball teams, basketball teams, golf teams, e-sports teams, and the like, and may include both domestic sports teams and foreign sports teams. The sports team ranking 130 may be updated at predetermined time intervals (e.g., 10 minutes, 1 hour, 2 hours, and the like).

In an embodiment, the sports team ranking 130 may be provided in the form of a chart indicating real-time rankings of the interest of users with respect to each of the sports teams. In this case, the sports team ranking 130 may be determined based on the degree of interest of users with respect to currently occurring sports game events. For example, the sports team ranking 130 may be determined based on search terms associated with sports, among various search terms entered to the search engine. Specifically, as more search terms associated with a specific sports team are searched by the users, it may be determined that the interest of users with respect to the specific sports team is higher.

The sports team ranking 130 may include rankings, emblems, team names, and the like of the sports teams. As illustrated, through the sports team ranking 130, the user 110 may find that the teams "Daejeon Hana Citizen", "Heungkuk Life Pink Spiders", and "Hanwha Eagles" are receiving, in order, the highest amount of attention, the second highest amount of attention and the third highest amount of attention. Additionally, the sports team ranking 130 may also include event information 132 associated with the corresponding sports team, which may be displayed next to the team name. By checking the event information 132, the user 110 may be able to easily check the latest event (e.g., a victory, a score by player of the team, and the like) associated with the ranking change of the corresponding sports team. For example, "K-League Championship" may also be displayed as an event associated with "Daejeon Hana Citizen", so that the user 110 can easily find why "Daejeon Hana Citizen" ranked first in the sports team ranking 130. Additionally, the sports team ranking 130 may further include a Ranking Change icon 134 that indicates whether the ranking is rising or falling, a My Team icon 136 to move to a page where it is possible to find the detailed information on the sports team, and the like.

While FIG. 1 illustrates that the sports team ranking 130 includes the rankings, the emblems, the team names, the event information 132, the Ranking Change icon 134, the My Team icon 136, and the like of the sports teams, embodiments are not limited thereto. For example, a game image, a game video, sports news, and the like associated with the event information 132 may be included in the sports team ranking 130, or link information or an icon for accessing any of the above may be further included. In addition, while FIG. 1 illustrates that the rankings of the top 10 sports teams are displayed on the user terminal 120, embodiments are not limited thereto, and accordingly, the rankings of all sports teams, or any number of top ranking sports teams, may be displayed on the user terminal 120.

With this configuration, the sports team ranking 130 generated by extracting only the sports search terms of the search terms entered into the search engine may be provided, thereby allowing the user to view the sports-related real-time events for each sports team at a glance, without including content based on other issues, such as politics, entertainment, society, and the like.

Figure 2:
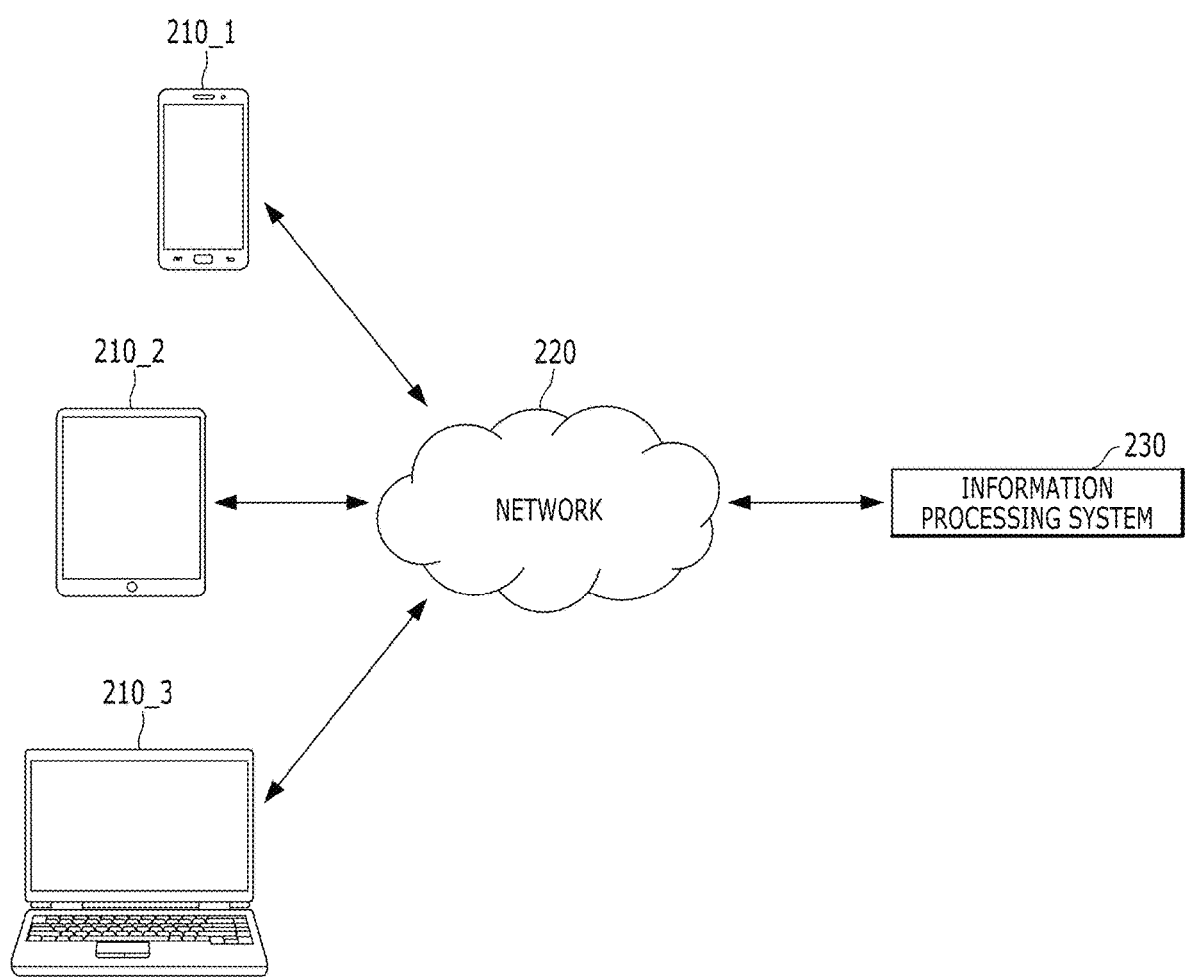
FIG. 2 is a schematic diagram illustrating a configuration in which an information processing system is communicatively connected to a plurality of user terminals in order to provide a service for providing a real-time sports team ranking according to an embodiment.

FIG. 2 is a schematic diagram illustrating a configuration in which an information processing system 230 is communicatively connected to a plurality of user terminals 210_1, 210_2, and 210_3 to provide a service for providing a real-time sports team ranking according to an embodiment. The information processing system 230 may include a system(s) capable of providing a service for providing a sports team ranking through a network 220. In an embodiment, the information processing system 230 may include one or more server devices and/or databases, or one or more distributed computing devices and/or distributed databases based on cloud computing services that can store, provide and execute computer-executable programs (e.g., downloadable applications) and data relating to the service for providing a sports team ranking. The service for providing a sports team ranking provided by the information processing system 230 may be provided to the user through a search application or a web browser application installed in each of a plurality of user terminals 210_1, 210_2, and 210_3. For example, the service for providing a sports team ranking may include a service for providing an integrated sports team ranking, a service for providing a sports team ranking for each league, a service for providing a sports team ranking for each sports category, and the like.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device, RS-serial communication, and the like, a wireless network such as a mobile communication network, a wireless LAN (WLAN), Wi-Fi, Bluetooth, ZigBee, and the like, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between user terminals 210_1, 210_2, and 210_3, but embodiments are not limited thereto.

In FIG. 2, a mobile phone terminal 210_1, a tablet terminal 210_2, and a PC terminal 210_3 are illustrated as the examples of the user terminals, but embodiments are not limited thereto, and the user terminals 210_1, 210_2, and 210_3 may be any computing device that is capable of wired and/or wireless communication and that upon which can be installed a search application, a web browser application, and the like, and that can execute the same. For example, the user terminal may include a smart phone, a mobile phone, a navigation system, a computer, a notebook computer, a digital broadcasting terminal, a Personal Digital Assistant (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but embodiments are not limited thereto, and a different number of user terminals may be configured to be in communication with the information processing system 230 through the network 220.

In an embodiment, the information processing system 230 may receive a search term input from the user terminals 210_1, 210_2, and 210_3 through a search application, a web browser application, and the like running on the user terminals 210_1, 210_2, and 210_3, and extract search terms associated with sports from among the received search terms. Then, the information processing system 230 may cluster the extracted sports search terms by event, calculate a score for each event, and determine a sports team ranking associated with the corresponding event. The information processing system 230 may transmit the determined sports team ranking to the user terminals 210_1, 210_2, and 210_3.

Figure 3:
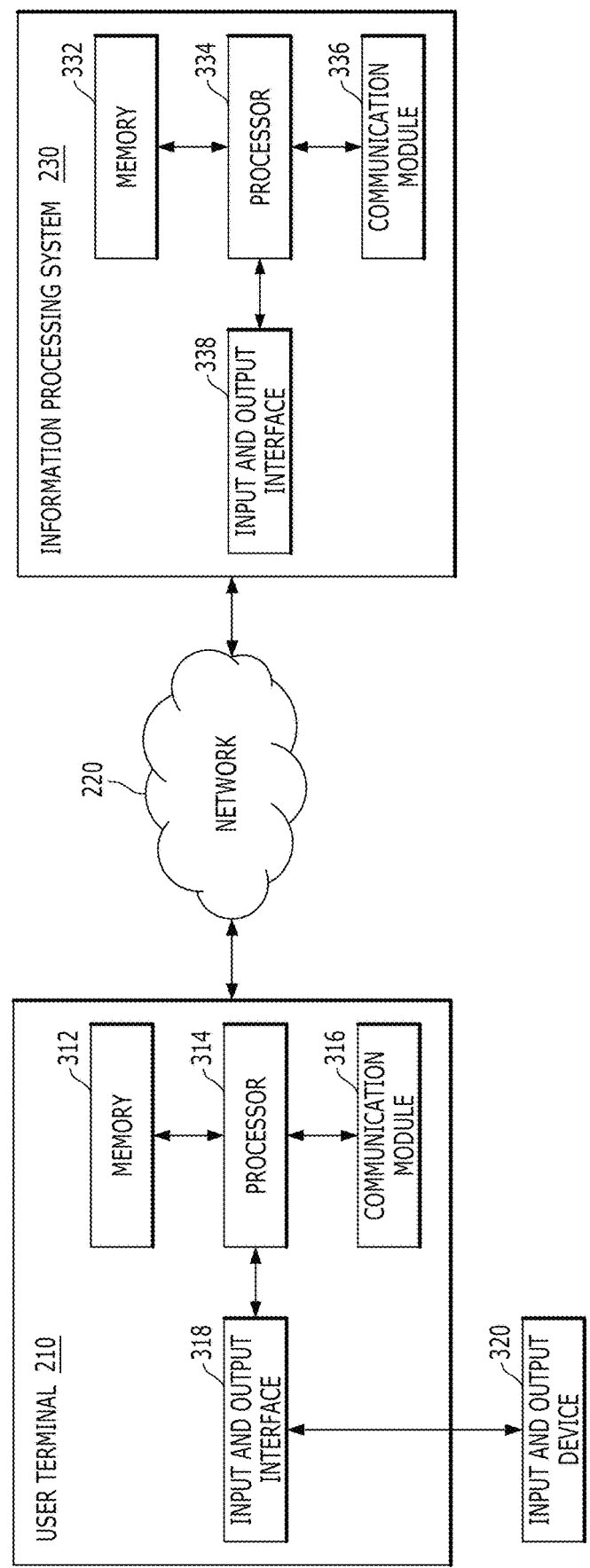
FIG. 3 is a block diagram illustrating an internal configuration of the user terminal and the information processing system according to an embodiment.

FIG. 3 is a block diagram illustrating an internal configuration of the user terminal 210 and the information processing system 230 according to an embodiment. The user terminal 210 may refer to any computing device that is capable of executing the search application, the mobile browser application or the web browser, and that is also capable of wired/wireless communication, and may include the mobile phone terminal 210_1, the tablet terminal 210_2, and the PC terminal 210_3 of FIG. 2, and the like, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for the search application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than through the computer-readable recording medium. For example, one or more programs may be loaded into the memories 312 and 332 based on a computer program (e.g., an application that provides a search service, a service for providing a sports team ranking, and the like) installed by the files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or from the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., search terms input by user, information on request for sports team ranking, and the like) generated by the processor 314 of the user terminal 210 according to the program code stored in the recording device such as the memory 312 or the like may be transmitted to the information processing system 230 through the network 220 under the control of the communication module 316. Conversely, a control signal or instructions provided under the control of the processor 334 of the information processing system 230 may be received by the user terminal 210 through the communication module 316 of the user terminal 210 via the communication module 336 and the network 220. For example, the user terminal 210 may receive the sports team ranking and the like from the information processing system 230 through the communication module 316.

The input and output interface 318 may be a means for interfacing with the input and output device 320. As an example, the input device may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 318 may be a means for interfacing with a device, such as, for example, a touch screen or the like that integrates a configuration or function for performing both inputting and outputting. For example, when the processor 314 of the user terminal 210 processes the instructions of the computer program loaded in the memory 312, a service screen, which includes information on sports team ranking or the like, and which is configured with the information and/or data provided by the information processing system 230 or other user terminals, may be displayed on the display through the input and output interface 318. While FIG. 3 illustrates that the input and output device 320 is not included in the user terminal 210, embodiments are not limited thereto, and the input and output device 320 and the user terminal 210 may be configured as a single device. In addition, the input and output interface 338 of the information processing system 230 may be a means for interfacing with a device (not illustrated) for inputting or outputting, which may be connected to the information processing system 230 or included in the information processing system 230. In FIG. 3, while the input and output interfaces 318 and 338 are illustrated as components that are configured separately from the processors 314 and 334, embodiments are not limited thereto, and the input and output interfaces 318 and 338 may be configured to be included in the processors 314 and 334, respectively.

The user terminal 210 and the information processing system 230 may include more components than the components illustrated in FIG. 3. Meanwhile, most of the related components may not necessarily require exact illustration. According to an embodiment, the user terminal 210 may be implemented to include at least a part of the input and output device 320 described above. In addition, the user terminal 210 may further include other components such as a transceiver, a global positioning system (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 210.

According to an embodiment, the processor 314 of the user terminal 210 may be configured to operate a search application that provides a service for providing a sports team ranking, or a web browser application. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. In addition, such information and/or data may be provided to the information processing system 230 through the communication module 316.

While the search application or the web browser application is running, the processor 314 may receive text, image, video, and the like input or selected through the input device such as a camera, a microphone, and the like that includes a touch screen, a keyboard, an audio sensor and/or an image sensor connected to the input and output interface 318, and store the received text, image, and/or video or the like in the memory 312, or provide it to the information processing system 230 through the communication module 316 and the network 220. In an embodiment, the processor 314 may provide through an input device a search term input by the user on the search application or the web browser application to the information processing system 230 through the network 220 and the communication module 316.

The processor 334 of the information processing system 230 may be configured to manage, process, and/or store the information and/or data received from a plurality of user terminals and/or a plurality of external systems. In an embodiment, the processor 334 may extract sports search terms associated with sports based on a plurality of search terms received from the user terminal 210. Additionally or alternatively, the processor 334 may cluster the plurality of sports search terms by event and calculate a score for each event. Then, the processor 334 may determine rankings of the sports teams by calculating the scores for the respective events.

Figure 4:
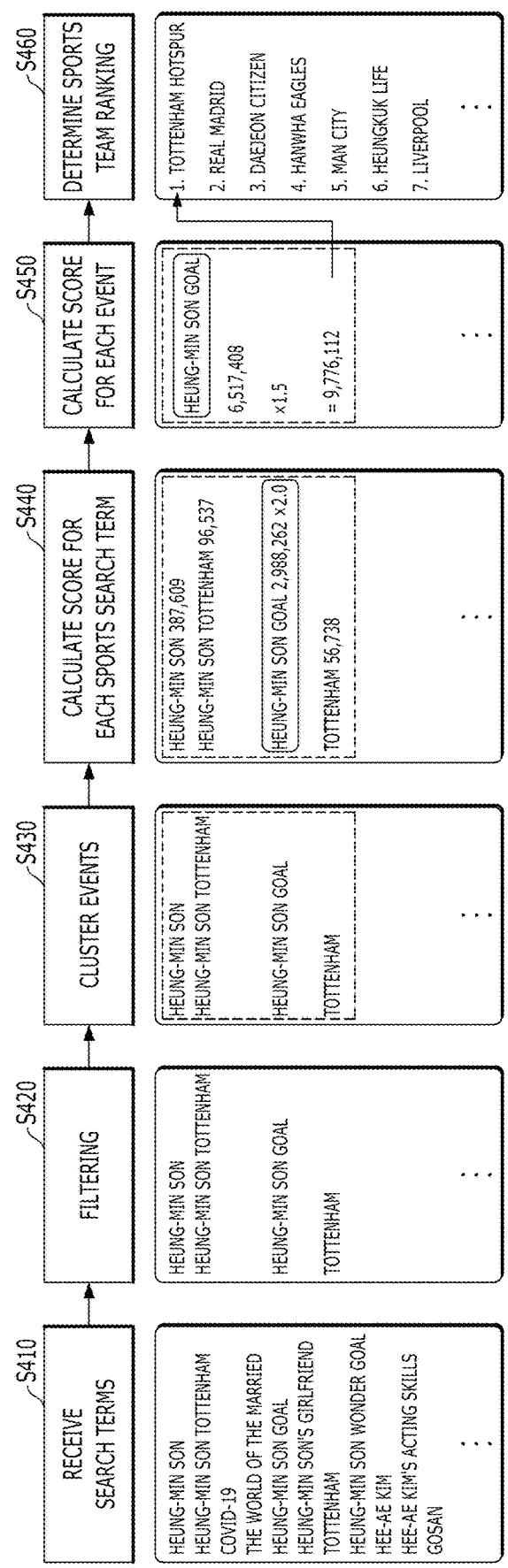
FIG. 4 is a flowchart illustrating an example of a method for determining a sports team ranking according to an embodiment.

FIG. 4 is a flowchart illustrating an example of a method for determining a sports team ranking according to an embodiment. As illustrated, the method for determining a sports team ranking may be initiated by the processor(s) of the information processing system (e.g., 230 in FIG. 2) receiving search terms, at S410. For example, the processor may receive search terms such as "Heung-Min Son", "Heung-Min Son Tottenham", "COVID-19", "The World of the Married", "Heung-Min Son Goal", "Heung-Min Son's Girlfriend", "Tottenham", "Heung-Min Son Wonder Goal", "Hee-Ae Kim", "Hee-ae Kim's acting skills", "Gosan", and the like. In an embodiment, the information processing system may receive the search terms directly from the user terminals. In another embodiment, the information processing system may receive the search terms received by a separate search server from the user terminals. In this case, the search server may transmit collected search terms to the information processing system at predetermined intervals (e.g., 30 seconds).

After receiving the search terms, the processor may filter the search terms to extract the search terms associated with sports, at S420. For example, among the received search terms, the processor may extract sports search terms of "Heung-Min Son", "Heung-Min Son Tottenham", "Heung-Min Son Goal", "Tottenham", "Heung-Min Son Wonder Goal", and the like. Additionally, the processor may exclude the sports search terms associated with past events (e.g., events that have occurred more than 3 months ago, or that occurred in the past more than a predetermined amount of days ago) that are not the recent events. For example, the processor may determine that "Heung-Min Son Wonder Goal" is a search term associated with an event that has occurred 3 or more months ago, and exclude the corresponding search term.

After extracting the sports search terms, the processor may cluster the extracted sports search terms by event, at S430. In an embodiment, the processor may cluster the sports search terms by event based on the player list information of each sports team. Specifically, by using the player list information of each sports team, the processor may cluster, into one event, the sports search terms that include the name of a specific sports team, the sports search terms that include the name of a player of the specific sports team, and the like. In another embodiment, the processor may cluster the sports search terms by event by calculating a probability that the sports search terms are associated with the same event. In addition, the processor may cluster the sports search terms by event by using various other clustering techniques. For example, the sports search terms such as "Heung-Min Son", "Heung-Min Son Tottenham", "Heung-Min Son Goal", "Tottenham", and the like may be grouped as being associated with the same event.

After the event clustering, the processor may calculate a score for each sports search term, at S440. In an embodiment, the processor may apply a pre-defined weight for each keyword to the number of searches for a sports search term, to calculate the scores of the sports search terms. In this case, the number of searches for each sports keyword may be the number of searches accumulated for a predetermined time (e.g., 10 minutes, 30 minutes, 1 hour, 2 hours, and the like). The weight for each keyword may indicate which weight is to be applied to the keywords (e.g., victory, goal, hat-trick, assist, and the like) associated with the sports game. For example, when "Goal" is a keyword to which double weight is applied, the score of "Heung-Min Son Goal" may be 2,998,262 points by multiplying the number of searches by two. Since "Heung-Min Son", "Heung-Min Son Tottenham", and "Tottenham" do not have keywords associated with the sports game, a weight is not applied, and the number of searches may itself be the score. The weight for each keyword may be determined based on the influence of each keyword on victory or defeat of the sports game.

In an embodiment, the processor may determine a sports keyword, which has the highest score among the sports keywords included in one event, to be the representative sports keyword of the corresponding event. In this example, the representative sports keyword may be used as a name or event information of the corresponding event. For example, since "Heung-Min Son Goal" has the highest score among "Heung-Min Son", "Heung-Min Son Tottenham", "Heung-Min Son Goal", and "Tottenham", the processor may determine "Heung-Min Son Goal" to be the representative keyword of the corresponding event.

Then, the processor may calculate a score for each event, at S450. Specifically, the score for each event may be calculated by summing the scores of all sports search terms included in each event. For example, the score for the "Heung-Min Son Goal" event may be calculated as 6,517,408 points, by summing 387,609 points for "Heung-Min Son", 96,537 points for "Heung-Min Son Tottenham", 5,976,524 points for "Heung-Min Son Goal" and 56,738 points for "Tottenham".

In an embodiment, the processor may determine a weight for each event based on the latest sports news data (e.g., sports-related news articles), and update the event score based on the determined weight. Specifically, the processor may determine a weight to be applied to the corresponding event based on the degree of relevance between the event and the latest sports news data. In this example, the latest sports news data may be text data included in sports-related news articles published within a predetermined period (e.g., 1 day, 1 week, 1 month, and the like). In this case, as there are more sports search terms (or the representative sports search term) included in the event found in the latest sports news data, the processor may determine that there is a higher degree of relevance between the event and the latest sports news data. As there is a higher degree of relevance between the event and the latest sports news data, a higher weight may be applied to the corresponding event. That is, because there are more of the latest sports news articles related to the event, a higher weight may be applied to the corresponding event. For example, by the application of a weight of 1.5, the event score of the "Heung-Min Son Goal" event may be updated to 9,776,112 points.

Based on the score for each event, the processor may determine the rankings of the sports teams, at S460. To this end, the processor may associate each event with one sports team and determine the score of the event as the score of the associated sports team. In an embodiment, the processor may determine a sports team associated with the event based on the player list information of each sports team. For example, the "Son Heung-Min Goal" event may be matched with "Tottenham Hotspur" which is the team Heung-Min Son plays for, so that the score of "Tottenham Hotspur" may be determined to be 9,776,112. The scores of the other sports teams may be determined in a similar manner, and the sports team rankings may be determined based on the scores of the sports teams. The processor may update the sports team ranking at regular intervals (e.g., 10 minutes, 30 minutes, 1 hour, 2 hours, and the like). In this case, the number of searches for a sports keyword, the score of a sports keyword, the score of an event, and the like may be initialized in synchronization with these intervals. With such a configuration, it is possible to provide sports team rankings of the sports teams for which many users are currently searching or which have been introduced in many of the latest news articles.

Figure 5:
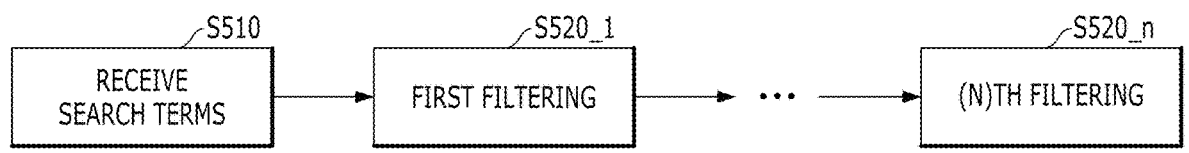
FIG. 5 is a flowchart illustrating an example of a method for filtering a search term according to an embodiment.

FIG. 5 is a flowchart illustrating an example of a method for filtering a search term according to an embodiment. The method for filtering a search term may be initiated by the processor (e.g., at least one processor of the information processing system) receiving the search terms, at S510. As illustrated, the processor may perform a plurality of filtering steps S520_1 to S520_*n* in order to filter the received search terms to extract sports search terms that are related to sports. In each filtering step, various filtering techniques/modules may be used to extract the sports-related search terms.

In an embodiment, as one of the filtering steps S520_1 to S520_*n*, the processor may perform filtering based on a pre-defined list of sports keywords. Specifically, the processor may use the pre-defined list of sports keywords stored internally (or received from an external device) to extract a search term of the search terms, which matches or includes the sports keyword, as a sports search term. For example, the sports keyword may include a sports team name, a sports player name, a sporting term, a sports category name, a sports league name, and the like. The pre-defined list of sports keywords may be updated periodically. For example, when there is a new player, a new sports team, a new sporting term, and the like, a new sports keyword may be added to the list of sports keywords, or a sports keyword previously included in the list may be deleted.

In an embodiment, as one of the filtering steps S520_1 to S520_*n*, the processor may perform filtering based on a pre-defined list of place names/company names. Specifically, the processor may use the pre-defined list of place names/company names stored internally (or received from an external device) to remove a search term from the received search terms when the term includes at least one of the place name or the company name. In this case, the place name or the company name may include both domestic and foreign place names or the names of the companies. For example, place names or the names of sports team sponsoring companies, such as "Suwon city" and "Pohang city", or "Samsung Fire" may sometimes be associated with specific sports team names, but since it is more likely that the search terms are irrelevant to the sports events, the processor may remove the search terms including the place name, the company name, and the like.

In an embodiment, as one of the filtering steps S520_1 to S520_*n*, the processor may remove a search term from the received search terms that is associated with a sports event that occurred before a predetermined time period (e.g., more than 3 months ago). Specifically, the processor may determine whether or not the search term is a search term associated with a sports event that occurred more than a predetermined time ago, based on past sports game broadcast data, past sports news data, past information on sports team ranking (including event information), and the like.

In an embodiment, as one of the filtering steps S520_1 to S520_*n*, the processor may extract a search term of the received search terms, which is associated with the latest sports event (e.g., occurred within the past 3 months). Specifically, the processor may determine whether or not the search term is associated with the latest sports event based on the sports game broadcast data, sports news data, and the like. In this case, the sports game broadcast data may include text game broadcast data, audio game broadcast data, video game broadcast data, and the like. For example, the processor may analyze names of sports teams, names of players in the teams, keywords related to game records, and the like from the text of the received text game broadcast data to extract the sports events and the associated keywords. As another example, the processor may convert the audio of the received voice game broadcast data into text using speech to text (STT) technology and the like, and extract the sports events and the associated keywords. In this case, the processor may perform an analysis to estimate the emotion of the commentator from the pitch, intonation, and the like of the commentator's voice, and determine the importance of the event, the importance of the keyword, and the like based on the estimation of the emotion.

While FIG. 5 illustrates that the processor performs in times of filtering, it is also possible to perform the filtering operation only once. For example, the processor may extract a sports search term from the received search term using a machine learning model trained to detect the sports related keywords. The machine learning model (or other type of artificial intelligence) may be trained by learning the sports game broadcast data, sports news data, and the like.

Figure 6:
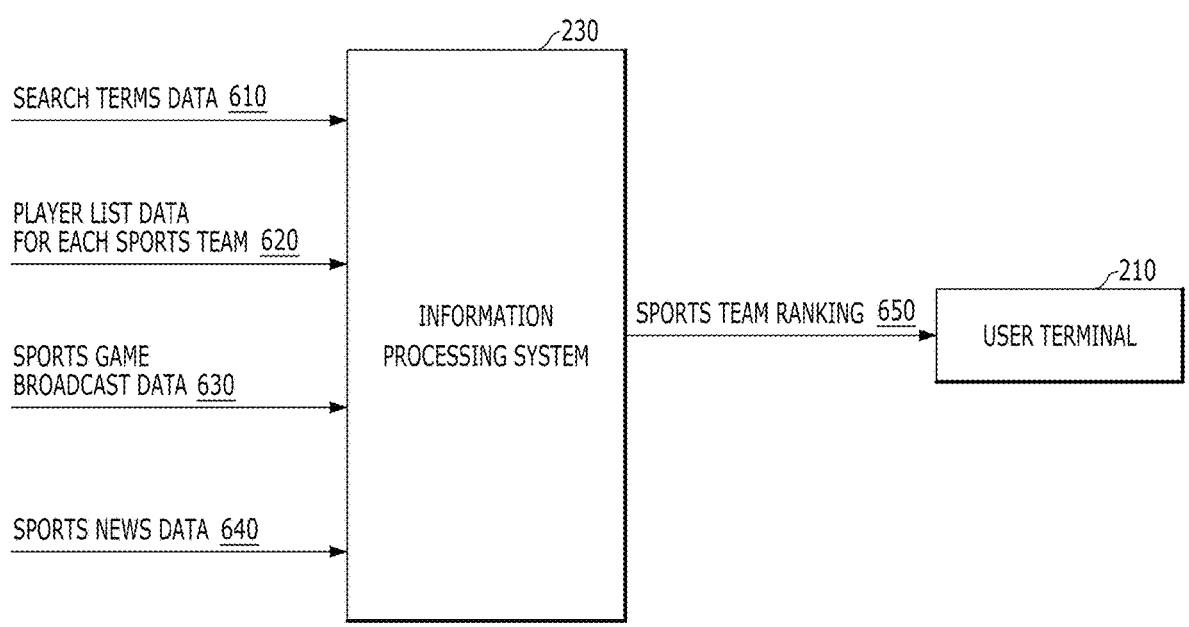
FIG. 6 is a diagram illustrating an example of generating a sports team ranking based on data received by the information processing system and transmitting the generated ranking to the user terminal.

FIG. 6 is a diagram illustrating an example of generating a sports team ranking 650 based on data received by the information processing system 230 and transmitting the generated ranking to the user terminal 210. As illustrated, the information processing system 230 may receive search term data 610, player list data 620 for each sports team, sports game broadcast data 630, sports news data 640, and the like from an external device. The information processing system 230 may generate the sports team ranking 650 based on at least one of the search term data 610, the player list data 620 for each sports team, the sports game broadcast data 630, and the sports news data 640.

In an embodiment, the information processing system 230 may receive the search term data 610 collected at predetermined intervals (e.g., 30 seconds) from the search server. The search term data 610 may include the search terms received by the search server from the user terminals, the time information associated therewith, and the like. Although the search term data 610 may include search terms from various fields such as society, the economy, sports, entertainment, and the like, the information processing system 230 may extract only the sports search terms from the received search terms, and the information processing system may then count the accumulated number of searches for each sports search term for a predetermined time (e.g., 10 minutes, 30 minutes, 1 hour, 2 hours, and the like). As described in detail above, the information processing system 230 may perform search term filtering based on at least one of the pre-defined list of sports keywords, the pre-defined list of place names/company names, the sports game broadcast data 630, or the sports news data 640.

The player list data 620 for each sports team may include sports team data including teams of various different sports categories, such as soccer teams, baseball teams, volleyball teams, basketball teams, golf teams, e-sports teams, and the like, and data about the players in the corresponding sports teams. The information processing system 230 may use the player list data 620 for each sports team to cluster the sports search terms by event. Additionally, the information processing system 230 may use the player list data 620 for each sports team to determine a sports team associated with the event.

The sports game broadcast data 630 may include text game broadcast data, audio game broadcast data, video game broadcast data, and the like. The information processing system 230 may use the sports game broadcast data 630 to determine whether or not a specific search term is associated with a recent sports event or a past sports event that occurred a predetermined time ago. Additionally or alternatively, the information processing system 230 may use the sports game broadcast data 630 to train the machine learning model to detect the sports search terms.

The sports news data 640 may include news articles data that is accessible online and associated with sports. The information processing system 230 may use the sports news data 640 to determine weights for the events. Additionally or alternatively, the information processing system 230 may use the sports news data 640 to determine whether or not a specific search term is associated with a recent sports event or a sports event that occurred a predetermined time ago. Additionally or alternatively, the information processing system 230 may use the sports news data 640 to train the machine learning model to detect the sports search terms.

FIG. 7 is a diagram illustrating an example of weight data for each keyword according to an embodiment. In an embodiment, the processor may apply a pre-defined weight for each keyword to the number of searches for a sports search terms, to calculate the scores of the sports search terms. The weight for each keyword may be stored in the keyword weight data, and may include a weight for each term related to various sports categories. The keyword weight data may be implemented in the form of a lookup table or any other data structure that associates keywords with weights.

As illustrated, the keyword weight data may include a baseball keyword weight list 710 and a soccer keyword weight list 720. For example, the baseball keyword weight list 710 may define the weights for each of the keywords related to baseball games, such as "victory", "shutout victory", "shutout", "cycling hit", "back to back home run", "back to back", "complete game victory", "complete game", "home run", "bench clearing", "ben-cle", and "good defense". In addition, the soccer keyword weight list 720 may define the weights for each of the keywords related to soccer games, such as "victory", "hat-trick", "goal", "penalty kick", and "assist".

In an embodiment, the pre-defined weight for each keyword may be determined based on the influence of each keyword on victory or defeat of a sports game. For example, the weight for the keyword "victory", which represents the victory of a sports game, may be the highest as 10, and the weight for keywords such as "good defense", "assist", and the like, which have less influence on the victory or defeat in the sports games, may be the lowest as 1.5. Accordingly, regarding a sports search term that includes the keyword "victory", the processor may apply the weight of 10 to the number of searches for the corresponding sports search term, and regarding a sports search term that includes the keyword "good defense", the processor may apply the weight of 1.5 to the number of searches for the corresponding sports search term, to calculate the score of the corresponding sports search terms.

In an embodiment, the weight for each keyword may be adjusted based on the sports game broadcast data received from an external device. The sports game broadcast data may include text game broadcast data, audio game broadcast data, video game broadcast data, and the like. Specifically, the processor may adjust the weight for each keyword in accordance with the frequency at which the keywords are detected in the text game broadcast data. For example, when the keyword "goal" is detected multiple times from the text game broadcast data, the processor may temporarily or permanently increase the weight for the "goal" keyword in order to effectively reflect the fact that the corresponding sports game is a multi-scoring game. Additionally or alternatively, the processor may adjust the weight for each keyword in accordance with the frequency at which the keywords are detected in the audio/video game broadcast data. Additionally or alternatively, the processor may analyze the commentator's emotion based on the pitch, intonation, and the like of the commentator's voice, and adjust the weight for each keyword using the degree of excitement of the commentator, the frequency at which the keyword is detected, and the like.

Additionally or alternatively, the weight for each keyword may be adjusted based on the sports news data received from an external device. The sports news data may refer to news article data that is accessible online and associated with sports. The processor may adjust the weight for each keyword in accordance with the frequency at which the keywords are detected in the latest sports news data. For example, when the frequency of detection of the keyword "good defense" from the latest sports news data is high, the weight for the keyword "good defense" may be temporarily or permanently increased in order to effectively reflect the "good defense" event of a specific athlete who is becoming a hot topic.

In an embodiment, the weight for each keyword may be adjusted based on the sports game broadcast data and the sports news data received from an external device. With this configuration, it is possible to reflect the events related to the sports games to the sports team ranking more effectively, by reflecting the weight for each keyword when determining the sports team ranking.

FIG. 8 is a diagram illustrating an example of determining a weight for an event based on the sports news data according to an embodiment. As described above, the processor may sum the scores of the sports search terms included in the event to calculate the score of the event. Then, the processor may determine a weight for the event based on the sports news data, and update the score of the event based on the determined weight for the event. In this case, the sports news data may be text data included in the sports-related news articles published within a predetermined period of time (e.g., 1 day, 1 week, 1 month, and the like).

In an embodiment, the processor may extract the sports keywords from the latest sports news data (e.g., titles, contents, and the like of the sports news articles). As illustrated, when there is a first sports news 810 through a fifth sports news 850, the processor may extract the sports keywords such as "Manchester United", a soccer team of the English Premier League, "Scholes", a player in that team, and the like, from the first sports news 810. In addition, the processor may extract the sports keywords such as "Manchester United", "Rashford", "Greenwood", "Solskjaer", "Sancho", and the like from the second sports news 820 through the fourth sports news 840. In addition, the processor may extract the sports keywords such as "Klopp", the coach of the sports team, "Liverpool", the sports team, and the like from the fifth sports news 850. In this case, the processor may apply the weights to the scores of the events associated with the sports keyword having a high detection frequency, in accordance with the detection frequency. When determining the detection frequency of the keyword, the processor may apply the weights to the sports keywords included in the title of the sports news.

In another embodiment, as there are more sports search terms (or the representative sports search term) included in the event found in the latest sports news data, the processor may determine that there is a higher degree of relevance between the event and the latest sports news data. As there is a higher degree of relevance between the event and the latest sports news data, a higher weight may be applied to the corresponding event. That is, as there are more of the latest sports news articles related to the event, a higher weight may be applied to the corresponding event, which may result in a higher event score.

The weights may be applied to the events mainly mentioned in the latest sports news to increase the event score, thereby generating a sports team ranking that effectively reflects the latest sports event.

FIG. 9 is a diagram illustrating an example in which a sports team ranking for each league is provided according to an embodiment. In an embodiment, the sports team rankings may be provided for all of the sports teams, or the rankings may be classified by league and provided only for that specific league. In this case, the sports team ranking may include a navigation menu for checking the league rankings. As illustrated, the navigation menu may include an "All" menu 910, a "K League" menu 920, a "KBO" menu 930, a "Premier League" menu 940, and the like.

When the user selects the "All" menu 910 by a touch input or the like, rankings for all registered sports teams may be provided regardless of league. As illustrated, when the user selects the "K League" menu 920 by a touch input or the like, the sports team rankings included in the K League may be provided. For example, from the rankings of K-League sports teams, the user may find that "Jeonbuk Hyundai Motors", "Ulsan Hyundai Soccer Club", "Sangju Sangmu Soccer Club", "Daegu FC", "Pohang Steelers", "Gangwon FC", "Gwangju FC", "Seongnam FC", "FC Seoul", and "Suwon Samsung Bluewings" are currently receiving higher amounts of attention, in order.

Meanwhile, when the user selects the "KBO" menu 930 or the "Premier League" menu 940 by a touch input or the like, the rankings of the sports teams included in the KBO or the rankings of the sports teams included in the Premier League may be provided. With such a configuration, the user can check real-time sports events and sports team trends with respect to the sports teams in a league in which the user is interested at a glance.

FIG. 10 is a diagram illustrating an example in which the sports team ranking for each sports category is provided according to an embodiment. In an embodiment, the sports team rankings may be provided for all sports teams, regardless of sport, or the rankings may be classified by sports category (such as football, volleyball, baseball, basketball, etc.) and then only provided for that particular category. In this case, the sports team ranking may include a navigation menu for checking the rankings for each sports category. As illustrated, the navigation menu may include an "All" menu 1010, a "Soccer" menu 1020, a "Volleyball" menu 1030, a "Baseball" menu 1040, a "Basketball" menu 1050, and the like.

When the user selects the "All" menu 1010 by a touch input or the like, rankings of all registered sports teams may be provided regardless of the sports categories. As illustrated, when the user selects the "Soccer" menu 1020 by a touch input or the like, the rankings of domestic and foreign soccer teams may be provided. For example, from the soccer sports team rankings, the user may find that "Liverpool", "Ulsan Hyundai Soccer Club", "Leicester City", "Daegu FC", "Manchester United", "Real Madrid", "Gwangju FC", "Bayern Munich", "Leverkusen", and "Suwon Samsung Bluewings" are currently receiving higher amounts of attention, in order.

Meanwhile, when the user selects the "Volleyball" menu 1030, the "Baseball" menu 1040, or the "Basketball" menu 1050 by a touch input or the like, the sports team rankings for domestic and foreign volleyball teams, the sports team rankings for domestic and foreign baseball teams, and the sports team rankings for domestic and foreign basketball teams may be provided. With such a configuration, the user can check real-time sports events and sports team trends with respect to the sports teams in the sports category in which the user is interested in at a glance. While FIGS. 9 and 10 illustrate that the sports team rankings for each league and for each sports category are provided, embodiments are not limited thereto. For example, the user may check only the rankings for the sports teams that the user is interested in, by using a filter function such as domestic/foreign, league, and sports category, and the like.

FIG. 11 is a flowchart illustrating an example of a method 1100 for providing a sports team ranking according to an embodiment. In an embodiment, the method 1100 for providing a sports team ranking may be performed by an information processing system (e.g., at least one processor of the information processing system). As illustrated, the method 1100 for providing a sports team ranking may be initiated by the processor receiving a plurality of search terms input from a plurality of user terminals, at S1110.

In response to receiving the plurality of search terms, the processor may extract a plurality of sports search terms associated with sports from the received plurality of search terms, at S1120. In an embodiment, the processor may receive a plurality of pre-defined sports keywords, and extract the search term from the plurality of search terms that includes at least one of the plurality of sports keywords, as a sports search term. Additionally or alternatively, the processor may remove a search term from the plurality of search terms that includes at least one of a place name or a company name. Additionally or alternatively, the processor may remove a search term that is associated with a sports event that occurred at a time that is longer that a predetermined time ago. Additionally or alternatively, the processor may extract a plurality of sports search terms of the received plurality of search terms, by using a machine learning model trained to detect sports-related keywords. In this case, the machine learning model may be trained based on at least one of the sports game broadcast data or the sports news data received from an external device.

After extracting the sports search terms, the processor may cluster the plurality of sports search terms into a first event including a first set of sports search terms and a second event including a second set of sports search terms, at S1130. For example, the processor may cluster a plurality of sports search terms into a plurality of events including a first event and a second event. In an embodiment, the processor may extract the first set of sports search terms and the second set of sports search terms from a plurality of sports search terms, based on the player list information of each sports team.

After clustering by event, the processor may calculate a score for the first event based on the number of searches for each of the first set of sports search terms, at S1140. In addition, the processor may calculate a score for the second event based on the number of searches for each of the second set of sports search terms, at S1150. In an embodiment, the processor may apply the pre-defined weight for each keyword to the number of searches for each of the first set of sports search terms to calculate a score for each of the first set of sports search terms, and determine the score of the first event based on the calculated score of each of the first set of sports search terms. Likewise, the processor may apply the pre-defined weight for each keyword to the number of searches for each of the second set of sports search terms to calculate a score for each of the second set of sports search terms, and determine the score of the second event based on the calculated score of each of the second set of sports search terms. In this case, the pre-defined weight for each keyword may be determined based on the influence of each keyword on victory or defeat of a sports game. Additionally or alternatively, the pre-defined weight for each keyword may be adjusted based on at least one of the sports game broadcast data or the sports news data received from an external device.

In an embodiment, after calculating the event score, the processor may update the determined score of the first event and the score of the second event. Specifically, after receiving the sports news data from the external device, the processor may determine a weight for the first event based on the sports news data, and update the score for the first event based on the weight for the first event. Likewise, the processor may determine a weight for the second event based on the sports news data, and update the score for the second event based on the weight for the second event.

The processor may associate the first event with the first sports team, at S1160. In addition, the processor may associate the second event with the second sports team, at S1170. In an embodiment, the processor may determine a sports search term, which has the highest score among the first set of sports search terms, to be a representative sports search term of the first event, and determine that the first sports team is associated with the representative sports search term of the first event, based on the information on the player list for each sports team. Likewise, the processor may determine a sports search term, which has the highest score among the second set of sports search terms, to be a representative sports search term of the second event, and determine that the second sports team is associated with the representative sports search term of the second event, based on the player list information of each sports team.

Then, the processor may determine the rankings of the first sports team and the second sports team based on the score for the first event and the score for the second event, at S1180. In addition, the processor may provide the user with the sports team ranking that reflects the rankings of the first sports team and the second sports team. In an embodiment, the first sports team and the second sports team may belong to different sports leagues from each other and/or belong to different sports categories from each other. The processor, which transmits the sports team ranking to the user terminal, may provide the representative sports search term of the first event in association with the ranking of the first sports team, and provide the representative sports search term of the second event in association with the ranking of the second sports team. While FIG. 11 illustrates that the rankings of two sports teams are provided, embodiments are not limited thereto, and any number of sports team rankings may be provided.

The method for providing a sports team ranking described above may be provided as a non-transitory computer-readable recording medium storing instructions for execution on a computer. The medium may continuously store a program executable by a computer or temporarily store a program for execution or download. In addition, the medium may be a variety of recording means or storage means in a form in which a single piece of hardware or several pieces of hardware are combined, but is not limited to a medium directly connected to any computer system, and may be present on a network in a distributed manner. An example of the medium includes a medium that is configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, embodiments are not limited thereto, and may be implemented in conjunction with any computing environment, such as a network or distributed computing environment. Furthermore, aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for providing a sports team ranking, performed by at least one processor, comprising:
   receiving a plurality of sports search terms input from a plurality of user terminals of different users;
   clustering the plurality of sports search terms into a plurality of events including a first event and a second event;
   calculating a score for the first event based on a number of searches of each of a first set of sports search terms included in the first event;
   associating the first event with a first sports team;
   wherein the calculating a score for the first event includes:
      calculating a score of each of the first set of sports search terms by applying a pre-defined weight for each keyword to the number of searches of each of the first set of sports search terms; and
      determining a score of the first event based on the score of each of the first set of sports search terms.

2. The method according to claim 1, further comprising:
   calculating a score for the second event based on a number of searches of each of a second set of sports search terms included in the second event;
   associating the second event with a second sports team;
   determining rankings of the first sports team and the second sports team based on the score for the first event and the score for the second event; and
   displaying the first sports team and the second sports team in ranked order.

3. The method according to claim 1, wherein the pre-defined weight for each keyword is determined based on the influence of each keyword on victory or defeat of a sports game.

4. The method according to claim 1, wherein the pre-defined weight for each keyword is adjusted based on sports game broadcast data received from an external device.

5. The method according to claim 1, wherein the pre-defined weight for each keyword is adjusted based on sports news data received from an external device.

6. The method according to claim 1, further comprising:
   receiving sports news data from an external device;
   determining a weight for the first event based on the sports news data; and
   updating the score for the first event based on the weight for the first event.

7. The method according to claim 1, further comprising:
   determining a sports search term, which has a highest score among the first set of sports search terms, to be a representative sports search term of the first event.

8. The method according to claim 7, wherein the associating the first event with a first sports team includes determining that the first sports team is associated with the representative sports search term of the first event based on player list information of each sports team.

9. The method according to claim 7, further comprising:
   providing the representative sports search term of the first event in association with a ranking of the first sports team determined based on the score for the first event.

10. The method according to claim 1, wherein the receiving a plurality of sports search terms includes:
receiving a plurality of search terms input from the plurality of user terminals;
receiving a plurality of pre-defined sports keywords; and
extracting, from the plurality of search terms, search terms that include at least one of the plurality of sports keywords, as the plurality of sports search terms.

11. The method according to claim 1, wherein the receiving a plurality of sports search terms includes:
receiving a plurality of search terms input from the plurality of user terminals; and
removing, from the plurality of search terms, search terms that include at least one of place names or company names.

12. The method according to claim 1, wherein the receiving a plurality of sports search terms includes:
receiving a plurality of search terms input from the plurality of user terminals; and
removing search terms associated with sports events that occurred longer than a predetermined time ago.

13. The method according to claim 1, wherein the receiving a plurality of sports search terms includes:
receiving a plurality of search terms input from the plurality of user terminals; and
extracting the plurality of sports search terms from the received plurality of search terms, by using a machine learning model trained to detect sports-related keywords.

14. The method according to claim 13, wherein the machine learning model is trained based on at least one of sports game broadcast data or sports news data received from an external device.

15. The method according to claim 1, wherein the clustering the plurality of sports search terms into a plurality of events includes extracting the first set of sports search terms from the plurality of sports search terms, based on player list information of each sports team.

16. The method according to claim 2, wherein the first sports team and the second sports team belong to different sports leagues from each other.

17. The method according to claim 2, wherein the first sports team and the second sports team belong to different sports categories from each other.

18. A non-transitory computer-readable recording medium storing instructions for executing the method for providing a sports team ranking according to claim 1 on a computer.

19. The method according to claim 2, wherein the displaying also includes displaying event information adjacent to each of the first sports team and the second sports team, wherein the event information adjacent to the first sports team relates to an event associated with the first sports team and the event information adjacent to the second sport team relates to an event associated with the second sports team.

20. A system for providing a sports team ranking, comprising:
a communication module;
a memory; and
at least one processor connected to the memory and configured to execute at least one computer-readable program included in the memory,
wherein the at least one program includes instructions for:
receiving a plurality of sports search terms input from a plurality of user terminals of different users;
clustering the plurality of sports search terms into a plurality of events including a first event and a second event;
calculating a score for the first event based on a number of searches for each of a first set of sports search terms included in the first event;
associating the first event with a first sports team;
wherein the calculating a score for the first event includes:
calculating a score of each of the first set of sports search terms by applying a pre-defined weight for each keyword to the number of searches of each of the first set of sports search terms; and
determining a score of the first event based on the score of each of the first set of sports search terms.

* * * * *